(12) United States Patent
Wei et al.

(10) Patent No.: US 11,317,528 B2
(45) Date of Patent: Apr. 26, 2022

(54) ELECTRONIC BADGE AND HOUSING FOR THE SAME

(71) Applicant: BOE TECHNOLOGY GROUP CO., LTD., Beijing (CN)

(72) Inventors: Jinggang Wei, Beijing (CN); Yan Ren, Beijing (CN); Lei Cao, Beijing (CN); Pan Ni, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/445,923

(22) Filed: Jun. 19, 2019

(65) Prior Publication Data

US 2020/0196474 A1 Jun. 18, 2020

(30) Foreign Application Priority Data

Dec. 18, 2018 (CN) .......................... 201822125524.X

(51) Int. Cl.
*H05K 5/02* (2006.01)
*H05K 5/00* (2006.01)
(Continued)

(52) U.S. Cl.
CPC ......... *H05K 5/0286* (2013.01); *H05K 5/0017* (2013.01); *H05K 5/0217* (2013.01); *B42D 25/23* (2014.10); *B42D 25/30* (2014.10); *B42D 25/305* (2014.10); *B42D 25/364* (2014.10); *G06F 1/1626* (2013.01); *G06F 21/31* (2013.01);
(Continued)

(58) Field of Classification Search
CPC .. H05K 5/0286; H05K 5/0217; H05K 5/0017; G06F 21/35; G06F 21/36; G06F 21/41; G06F 21/43; G06F 21/335; G06F 21/40; G06F 21/34; G06F 21/42; G06F 21/33; G06F 21/32; G06F 21/313; G06F 21/316; G06F 21/31; G06F 1/1626; G06K 7/10376; G06K 19/041; G07F 7/0806; G07F 7/0813; G07F 7/08; G07F 7/0846; G07F 7/0833; G07F 7/0853; G07F 7/082; G07F 7/0826; G07F 7/084; B42D 25/364; B42D 25/305; B42D 25/30; B42D 25/23
See application file for complete search history.

(56) References Cited

U.S. PATENT DOCUMENTS 5,125,505 A * 6/1992 Kurosaki ............. A45C 11/182
206/39.4
5,402,095 A * 3/1995 Janniere ............... G06K 7/0021
200/292

(Continued)

*Primary Examiner* — Rockshana D Chowdhury
*Assistant Examiner* — Douglas R Burtner
(74) *Attorney, Agent, or Firm* — Nath, Goldberg & Meyer; Joshua B. Goldberg

(57) ABSTRACT

The present disclosure provides an electronic badge and a housing for the same. The housing includes: a rear case defining a main board cavity, and formed with a display opening in communication with the main board cavity and a profile card receiving slot located outside the main board cavity; and a front case detachably disposed on the rear case to enclose the profile card receiving slot or both the display opening and the profile card receiving slot, a portion of the front case opposite the profile card receiving slot or both the display opening and the profile card receiving slot being made of a transparent material.

16 Claims, 5 Drawing Sheets

(51) Int. Cl.
- *B42D 25/30* (2014.01)
- *B42D 25/364* (2014.01)
- *B42D 25/305* (2014.01)
- *B42D 25/23* (2014.01)
- *G07F 7/08* (2006.01)
- *G06F 1/16* (2006.01)
- *G06F 21/40* (2013.01)
- *G06F 21/33* (2013.01)
- *G06F 21/36* (2013.01)
- *G06F 21/31* (2013.01)
- *G06F 21/41* (2013.01)
- *G06F 21/43* (2013.01)
- *G06F 21/42* (2013.01)
- *G06F 21/35* (2013.01)
- *G06F 21/32* (2013.01)
- *G06F 21/34* (2013.01)

(52) U.S. Cl.
CPC .......... *G06F 21/313* (2013.01); *G06F 21/316* (2013.01); *G06F 21/32* (2013.01); *G06F 21/33* (2013.01); *G06F 21/335* (2013.01); *G06F 21/34* (2013.01); *G06F 21/35* (2013.01); *G06F 21/36* (2013.01); *G06F 21/40* (2013.01); *G06F 21/41* (2013.01); *G06F 21/42* (2013.01); *G06F 21/43* (2013.01); *G07F 7/08* (2013.01); *G07F 7/082* (2013.01); *G07F 7/084* (2013.01); *G07F 7/0806* (2013.01); *G07F 7/0813* (2013.01); *G07F 7/0826* (2013.01); *G07F 7/0833* (2013.01); *G07F 7/0846* (2013.01); *G07F 7/0853* (2013.01)

(56) References Cited

U.S. PATENT DOCUMENTS

| | | | | |
|---|---|---|---|---|
| 5,674,080 | A | * | 10/1997 | Takemura ............ G06K 7/0021 439/159 |
| 6,121,544 | A | * | 9/2000 | Petsinger ............ G06K 19/005 150/147 |
| 6,149,450 | A | * | 11/2000 | Gastineau ............ G06K 7/0021 439/325 |
| 6,672,514 | B1 | * | 1/2004 | Brennan ......... G06K 19/07743 235/492 |
| 6,922,333 | B2 | * | 7/2005 | Weng .................... G06F 1/1616 220/230 |
| 7,350,705 | B1 | * | 4/2008 | Frederick ............. G06K 7/0021 235/439 |
| 7,635,089 | B2 | * | 12/2009 | Augustinowicz .......................... G06K 19/07327 235/486 |
| 8,456,825 | B2 | * | 6/2013 | Miao ................... H04M 1/0249 361/679.27 |
| 8,567,459 | B2 | * | 10/2013 | Kitchen ............... A45C 11/182 150/147 |
| 9,282,662 | B2 | * | 3/2016 | Tsai .................... H04M 1/0249 |
| 9,697,453 | B2 | * | 7/2017 | Augustinowicz .......................... G06K 19/07318 |
| 9,907,375 | B1 | * | 3/2018 | Kitchen ............... A45C 13/005 |
| 10,152,668 | B2 | * | 12/2018 | Huff ................... G06K 19/0723 |
| 10,438,106 | B2 | * | 10/2019 | Breed ................ G06K 19/0723 |
| 2008/0092043 | A1 | * | 4/2008 | Trethewey ............. G06F 3/038 715/705 |
| 2008/0146265 | A1 | * | 6/2008 | Valavi ................... A61B 5/002 455/550.1 |
| 2012/0313754 | A1 | * | 12/2012 | Bona ...................... G07C 9/257 340/5.82 |
| 2014/0071023 | A1 | * | 3/2014 | Chu ...................... G06F 1/1647 345/3.1 |
| 2019/0096289 | A1 | * | 3/2019 | Harkness .......... G06K 7/10009 |
| 2021/0011988 | A1 | * | 1/2021 | Tonnoir ............... G06K 7/0004 |

\* cited by examiner

ELECTRONIC BADGE AND HOUSING FOR THE SAME

CROSS-REFERENCE TO RELATED APPLICATION

This application claims priority from Chinese patent application No. 201822125524.X filed with the China National Intellectual Property Administration on Dec. 18, 2018, the disclosure of which is incorporated herein by reference in its entirety.

TECHNICAL FIELD

The present disclosure relates to the field of office supplies, and particularly relates to a housing for an electronic badge and an electronic badge including the housing.

BACKGROUND

In order to facilitate personnel management, companies usually provide employees with a badge on which a profile card (which may be a photo of the employee or other information card) is typically disposed. The profile card is exposed on a surface of the badge and is prone to wear, resulting in unclear information.

Therefore, how to prevent wear of the profile card on the badge becomes a technical problem to be solved in the field.

SUMMARY

The present disclosure has been accomplished in order to at least partially solve the problems in related art. The present disclosure provides a housing for an electronic badge and an electronic badge including the housing, where the profile card in the electronic badge is not easily worn.

According to an aspect of the present disclosure, there is provided a housing for an electronic badge, including:

a rear case defining a main board cavity, and formed with a display opening in communication with the main board cavity and a profile card receiving slot located outside the main board cavity; and a front case detachably disposed on the rear case to enclose the profile card receiving slot or both the display opening and the profile card receiving slot, a portion of the front case opposite the profile card receiving slot or both the display opening and the profile card receiving slot being made of a transparent material.

In some embodiments, the profile card receiving slot is a sinking slot.

In some embodiments, the profile card receiving slot is located above the main board cavity in a top view of the rear case viewed in a direction from the front case to the rear case.

In some embodiments, the profile card receiving slot is located at a side of the main board cavity in a top view of the rear case viewed in a direction from the front case to the rear case.

In some embodiments, the rear case includes a rear case bottom plate, two first rear case sidewalls, and one second rear case sidewall, the first rear case sidewalls and the second rear case sidewall are both disposed on the rear case bottom plate, the two first rear case sidewalls are disposed oppositely and spaced apart, and the second rear case sidewall is connected to the two first rear case sidewalls, the front case includes a front case bottom plate, two first front case sidewalls and one second front case sidewall, the first front case sidewalls and the second front case sidewall are both disposed on the front case bottom plate, the two first front case sidewalls are disposed oppositely and spaced apart, and the second front case sidewall is connected to the two first front case sidewalls, and in a case where the front case and the rear case are completely assembled, the two first front case sidewalls are respectively opposite to the two first rear case sidewalls, the second front case sidewall is opposite to the second rear case sidewall, and the front case bottom plate is opposite to the rear case bottom plate, so as to cover at least part of the rear case by the front case.

In some embodiments, the first rear case sidewall is formed with a chute on a surface thereof facing the first front case sidewall opposite the first rear case sidewall, and the first front case sidewall is formed with a slider fitting the chute on a surface thereof facing the first rear case sidewall opposite the first front case sidewall.

In some embodiments, the chute is formed with an opening at an end, through which the slider enters the chute so that the front case is slidable relative to the rear case.

In some embodiments, the rear case further includes a locking block disposed in the chute, the slider being slidable past the locking block.

In some embodiments, the rear case further includes a hanging part disposed opposite the second rear case sidewall, where a first surface of the hanging part protrudes from the rear case bottom plate to a position flush with a surface of the front case bottom plate facing away from the rear case bottom plate in a case where the front case and the rear case are completely assembled, and the hanging part is formed with a hanging through hole.

In some embodiments, the second rear case sidewall is formed with an engaging recess on a surface thereof facing the second front case sidewall, the second front case sidewall is formed with an engaging protrusion on a surface thereof facing the second rear case sidewall, and in a case where the front case slides to a position where the second front case sidewall is attached to the second rear case sidewall, the engaging protrusion is engaged in the engaging recess.

In some embodiments, the first rear case sidewall and the second rear case sidewall are each provided with a first magnetic member, the first front case sidewall and the second front case sidewall are each provided with a second magnetic member, and in a case where the front case and the rear case are completely assembled, the first magnetic member and the second magnetic member are attracted to each other.

In some embodiments, at least one of the first magnetic member and the second magnetic member is provided with a flexible sealing film.

In some embodiments, the first rear case sidewall and the second rear case sidewall are provided with a plurality of concave parts uniformly distributed, the first front case sidewall and the second front case sidewall are provided with a plurality of convex parts uniformly distributed, and in a case where the front case and the rear case are completely assembled, each of the plurality of convex parts is engaged in a corresponding concave part.

In some embodiments, the convex part and the concave part have a smooth curved shape.

In some embodiments, the housing further includes a flexible sealing member disposed around at least one of the display opening and the profile card receiving slot.

In some embodiments, the front case is a one-piece member that covers the profile card receiving slot or both the display opening and the profile card receiving slot.

In some embodiments, the front case includes a first front case member covering the profile card receiving slot and a second front case member covering the display opening.

In some embodiments, the first front case member and the second front case member are independently and detachably disposed on the rear case.

In some embodiments, the housing is formed with a charging hole and at least one button hole.

According to another aspect of the present disclosure, there is provided an electronic badge including a display panel and the housing described above, the display panel being disposed in the main board cavity, and a display surface of the display panel being exposed from the display opening.

BRIEF DESCRIPTION OF DRAWINGS

Accompanying drawings are provided for further understanding of this disclosure and constitute a part of the specification. Hereinafter, these drawings are intended to explain the disclosure together with the following specific embodiments, but should not be considered as a limitation of the disclosure, in which.

DETAILED DESCRIPTION

Figure 1:
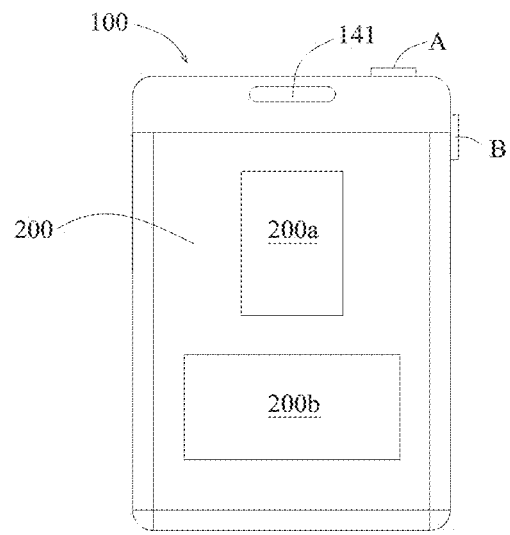
FIG. 1 is a schematic view showing a housing for an electronic badge according to an exemplary embodiment of the present disclosure, in which the front case is in a target position.

Hereinafter, exemplary embodiments of the present disclosure will be described in detail in conjunction with accompanying drawings. It should be understood that the exemplary embodiments as set forth herein are merely for the purpose of illustration and explanation of the disclosure and should not be constructed as a limitation thereof.

According to an aspect of the present disclosure, a housing for an electronic badge is provided. As shown in FIGS. 1 to 3b and 7, the housing includes a rear case 100 and a front case 200. The rear case 100 defines a main board cavity 10 receiving a display panel, and is formed with a display opening 100b in communication with the main board cavity 10. A profile card receiving slot 100a is formed on a surface of the rear case 100 and located outside the main board cavity 10. The front case 200 and the rear case 100 are disposed oppositely and detachably connected to each other so that when the front case 200 and the rear case 100 are completely assembled, the display opening 100b and the profile card receiving slot 100a are enclosed by the front case 200. Further, a portion 200a of the front case 200 opposite the profile card receiving slot 100a is made of a transparent material, and a portion 200b of the front case 200 corresponding to the display opening 100b is made of a transparent material.

Figure 6:
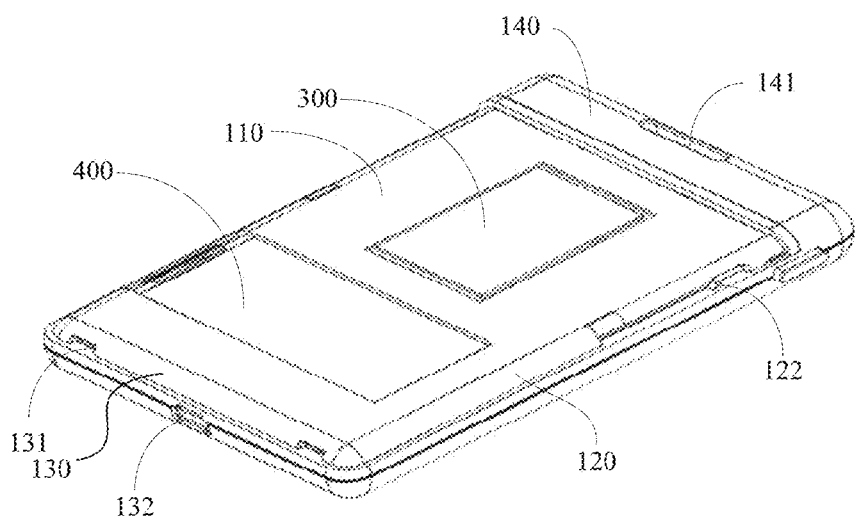
FIG. 6 is a schematic view showing an electronic badge according to an exemplary embodiment of the present disclosure, in which the front case is removed.

As described above, the housing is part of the electronic badge, and in addition to the housing, the electronic badge further includes a display panel. As shown in FIG. 6, a display panel 400 is disposed in the main board cavity 10, and a display surface of the display panel 400 is exposed through the display opening 100b. In addition, a profile card 300 is placed in the profile card receiving slot 100a. After the display panel 400 and the profile card 300 are placed, the front case 200 and the rear case 100 are assembled. On the one hand, the front case 200 can prevent wear of the display panel 400 and the profile card 300, and on the other hand, it is not necessary to bond the profile card 300 on the electronic badge with an adhesive. Thus, the profile card may be replaced conveniently. The portion 200a of the front case 200 opposite the profile card receiving slot 100a and the portion 200b corresponding to the display opening 100b are both transparent so that a user or supervisor will not be affected when reading the information on the display panel and the profile card. It should be understood that the manner in which the front case and the rear case are assembled into the housing, in addition to the above advantages, can also realize visual management by replacing or setting information such as a color of the front case. For example, in a hospital, a front case color of the electronic badge may be used for distinguishing different departments or wards.

Apparently, in addition to the display panel 400, other components may also be provided in the main board cavity 10. For example, a positioning component, a radio frequency attendance component, or the like may be disposed in the main board cavity 10 as needed for positioning or attendance purposes.

In an exemplary embodiment of the present disclosure, the specific material of the front case 200 is not particularly limited. For example, it is possible that only the portion 200a of the front case 200 opposite the profile card receiving slot 100a and the portion 200b of the front case 20 corresponding to the display opening 100b are made of a transparent material, while the rest of the front case 200 is made of an opaque material. Apparently, the present disclosure is not limited thereto. For example, the entire front case 200 may be made of a transparent material. For example, the front case 200 may be made of an acrylic material. The front case 200 can prevent wear of the display panel and the profile card while having a waterproof function.

In an exemplary embodiment of the present disclosure, the profile card receiving slot 100a is a sinking slot instead of a through slot so that the profile card 300 disposed in the profile card receiving slot 100a is better limited and prevented from sliding into the main board cavity 10 during use. Specifically, the profile card receiving slot 100a may have a depth of 0.5 mm. The profile card 300 in the profile card receiving slot 100a may be an employee ID photo, and the profile card receiving slot 100a may be sized according to a size of the ID photo. For example, in order to place a 2-inch ID photo, the profile card receiving slot 100a may be a rectangular slot of 36 mm×26 mm×0.5 mm.

Figure 7:
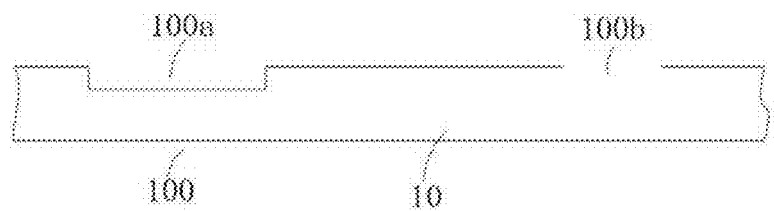
FIGS. 7 and 8 are partial schematic views showing a rear case of the housing according to an exemplary embodiment of the present disclosure.

In an exemplary embodiment of the present disclosure, as shown in FIG. 7, the profile card receiving slot 100a is located above the main board cavity 10 in a top view of the rear case 100 viewed in a direction from the front case 200 to the rear case 100. In this configuration, in the main board cavity 10, electronic components such as a positioning component, a radio frequency attendance component, and the like as described above may be disposed below the sinking profile card receiving slot 100a, i.e., a space below the profile card receiving slot 100a may be fully utilized to arrange other electronic components. Thereby, individual electronic components may be evenly arranged within a larger space to facilitate heat dissipation of the electronic components and production of a thinner rear case 100 (more specifically, a thinner electronic badge).

Figure 8:
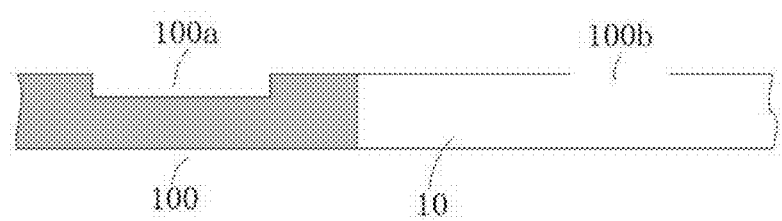

In a variation, as shown in FIG. 8, the profile card receiving slot 100a is located at a side of the main board cavity 10 in a top view of the rear case 100 viewed in a direction from the front case 200 to the rear case 100. This configuration may facilitate the manufacture (for example, molding) of the sinking profile card receiving slot 100a.

In an exemplary embodiment of the present disclosure, the front case 200 covers at least part of the rear case 100. For example, since the rear case 100 has a convex hanging part 140 (which will be described later), the front case 200 may cover only a portion of the rear case 100. In other exemplary embodiments of the present disclosure, the front case 200 may cover only the profile card receiving slot 100a or both the profile card receiving slot 100a and the display opening 100. For example, when components such as the display panel 400 are integrated into the rear case 100, the front case 200 may be used only for detachably covering the profile card receiving slot 100a.

Figure 3A:
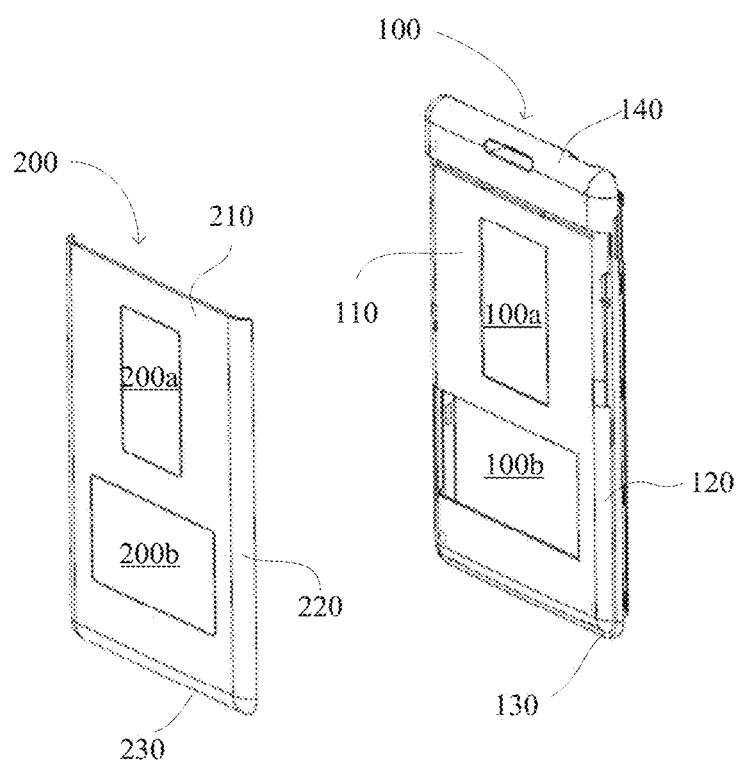
FIGS. 3a and 3b are exploded schematic views of the housing shown in FIG. 1.

As shown in FIG. 3a, the rear case 100 includes a rear case bottom plate 110, two first rear case sidewalls 120, and one second rear case sidewall 130. The first rear case sidewalls 120 and the second rear case sidewall 130 are both disposed on the rear case bottom plate 110. It should be noted that the first rear case sidewalls 120 and the second rear case sidewall 130 are both disposed at an edge of the rear case bottom plate 110.

Specifically, the two first rear case sidewalls 120 are disposed oppositely and spaced apart, while the second rear case sidewall 130 is connected to the two first rear case sidewalls 120. An extending direction of the first rear case sidewalls 120 (i.e., a length direction of the first rear case sidewalls 120) is perpendicular to an extending direction of the second rear case sidewall 130 (i.e., a length direction of the second rear case sidewall 130). The front case 200 includes a front case bottom plate 210, two first front case sidewalls 220 and one second front case sidewall 230. The first front case sidewalls 220 and the second front case sidewall 230 are both disposed on the front case bottom plate 210. The two first front case sidewalls 220 are disposed oppositely and spaced apart, while the second front case sidewall 230 is connected between the two first front case sidewalk 220. An extending direction of the second front case sidewalls 230 (i.e., a length direction of the second front case sidewalls 230) is perpendicular to an extending direction of the first front case sidewall 220 (i.e., a length direction of the first front case sidewall 220). It should be noted that the first front case sidewalls 220 and the second front case sidewall 230 are both disposed at an edge of the front case bottom plate 210.

When the front case 200 and the rear case 100 are assembled into the housing (i.e., when the front case 200 and the rear case 100 are completely connected), the two first front case sidewalk 220 are respectively opposite to the two first rear case sidewalls 120, the second front case sidewall 130 is opposite to the second rear case sidewall 230, and the front case bottom plate 210 is opposite to the rear case bottom plate 110, so as to cover at least part of the rear case 100 by the front case 200.

Figure 2:
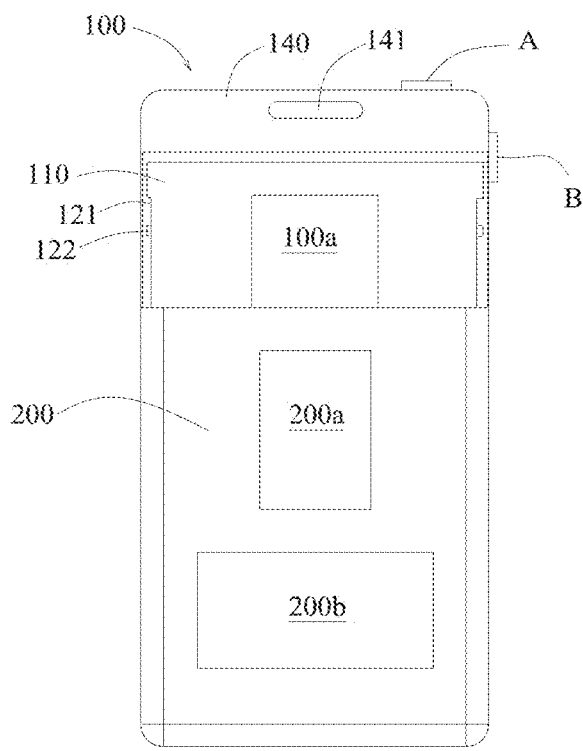
FIG. 2 is a schematic view showing a housing for an electronic badge according an exemplary embodiment of the present disclosure, in which the front case has not reached the target position.

As described above, the front case 200 is detachably coupled to the rear case 100. Therefore, in order to facilitate assembly of the front case 200 and the rear case 100, preferably, as shown in FIG. 2, the first rear case sidewall 120 is formed with a chute 121 on a surface thereof facing the first front case sidewall 220 opposite the first rear case sidewall 120, where the chute 121 is formed with an opening at an end thereof facing the second rear case sidewall 130. The first front case sidewall 220 is formed with a slider 221 (shown in FIG. 4) fitting the chute 121 on a surface thereof facing the first rear case sidewall 120 opposite the first front case sidewall 220, where the slider 221 enters the chute 121 through the opening so that the front case 200 is slidable relative to the rear case 100.

In an exemplary embodiment of the present disclosure, the opening of the chute 121 faces a first direction, the overall electronic badge has a plate shape, and the first direction is parallel to a plane of the plate shape.

It will be readily understood that assembly and disassembly of the housing may be accomplished by sliding the front case 200.

Figure 4:
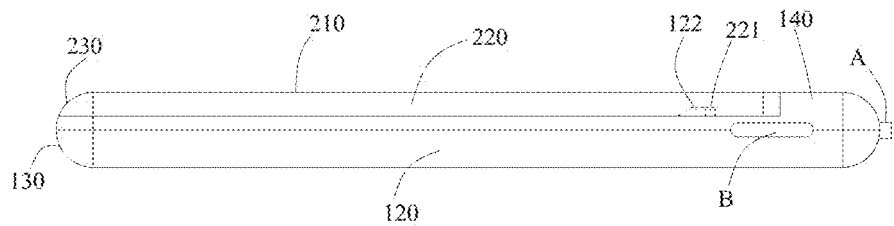
FIG. 4 is a side view of the housing shown in FIG. 1.

In an exemplary embodiment of the present disclosure, in order to lock the front case 200 and prevent it from falling off the rear case 100 after assembly, as shown in FIG. 4, the rear case 100 further includes a locking block 122 disposed in the chute 121. The slider 221 is slidable past the locking block 122. Specifically, the front case 200 includes a material (for example, an acrylic material) capable of elastic deformation. During the process of sliding the front case 200 to a target position, when the slider 221 passes the locking block 122, the front case 200 is slightly elastically deformed so that the slider 221 can pass the locking block 122. After that, the slider 221 and the locking block 122 are brought together to prevent the front case from sliding off the rear case during use. When the front case 200 needs to be removed, the removal can be done by slightly pushing the front case 200 to make the slider 221 pass through the locking block 122 along an opposite direction.

Figure 5:
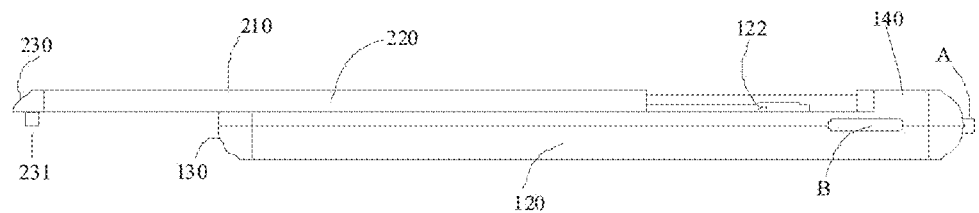
FIG. 5 is a side view of the housing shown in FIG. 2.

Generally, an employee carries the badge by a lanyard. In order to facilitate passage of the lanyard, in an exemplary embodiment of the present disclosure, the rear case 100 further includes a hanging part 140. As shown in FIG. 5, the hanging part 140 is located at the other end of the rear case bottom plate 110 in the length direction, i.e., the hanging part 140 is disposed opposite the second rear case sidewall 130. In addition, a first surface of the hanging part 140 protrudes beyond a surface of the rear case bottom plate 110 facing the front case bottom plate. When the front case 200 slides to a position where the second front case sidewall 230 is attached to the second rear case sidewall 130, a surface of the front case bottom plate 210 facing away from the rear case bottom plate 110 is flush with the first surface (as shown in FIG. 4). That is, the first surface of the hanging part 140 protrudes from the rear case bottom plate 110 to a position flush with the surface of the front case bottom plate 210 facing away from the rear case bottom plate 110 when the front case 200 and the rear case 100 are completely assembled.

A hook may be disposed on the hanging part 140, or, as shown in FIGS. 1 and 2, a hanging through hole 141 may be disposed on the hanging part 140 to facilitate passage of the lanyard.

In order to ensure a firm engagement between the front case 200 and the rear case 100, and prevent the second front case sidewall 230 of the front case 200 from upwarping after the front case 200 is connected to the rear case 100, in an exemplary embodiment of the present disclosure, as shown in FIG. 6, the second rear case sidewall 130 is formed with an engaging recess 131 on a surface thereof facing the second front case sidewall 230, and the second front case sidewall 230 is formed with an engaging protrusion 231 on a surface thereof facing the second rear case sidewall 130. When the front case slides to a position where the second front case sidewall 230 is attached to the second rear case sidewall 130, the engaging protrusion 231 is engaged in the engaging recess 131.

Figure 9:
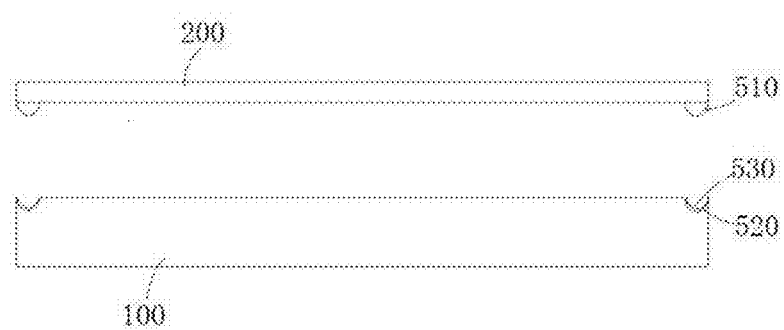
FIG. 9 is a schematic view showing a coupling manner between the front case and the rear case of the housing according to an exemplary embodiment of the present disclosure.

As described above, the front case 200 is coupled to the rear case 100 by means of chute and slider, but the present disclosure is not limited thereto. In an exemplary embodiment of the present disclosure, the front case 200 may also be coupled to the rear case 100 in a magnetic manner. Specifically, FIG. 9 is an exploded cross-sectional view of the housing taken along a direction parallel to the second rear case sidewall 130. As shown in FIG. 9, the first rear case sidewall 120 and the second rear case sidewall 130 are each provided with a first magnetic member 520, the first front case sidewall 220 and the second front case sidewall 230 are each provided with a second magnetic member 510, and in a case where the front case 200 and the rear case 100 are completely assembled, the first magnetic member 520 and the second magnetic member 510 are attracted to each other. With this magnetic configuration, the front case 200 can be easily and detachably disposed on the rear case 100.

In an exemplary embodiment of the present disclosure, as shown in FIG. 9, at least one of the first magnetic member 520 and the second magnetic member 510 is provided with a flexible sealing film 530. With this configuration, the flexible sealing film 530 may be disposed between the first magnetic member 520 and the second magnetic member 510, thereby improving the overall sealing and waterproof performance of the housing. The specific configuration of the first magnetic member 520 and the second magnetic member 510 is not limited as long as a sealing engagement can be achieved therebetween. For example, as shown in FIG. 9, the first magnetic member 520 may be a magnetic recess, while the second magnetic member 510 may be a magnetic protrusion. More specifically, for the entire housing, the first magnetic member 520 may be a U-shaped magnetic recess, and the second magnetic member 510 may be a U-shaped magnetic protrusion.

Figure 10:
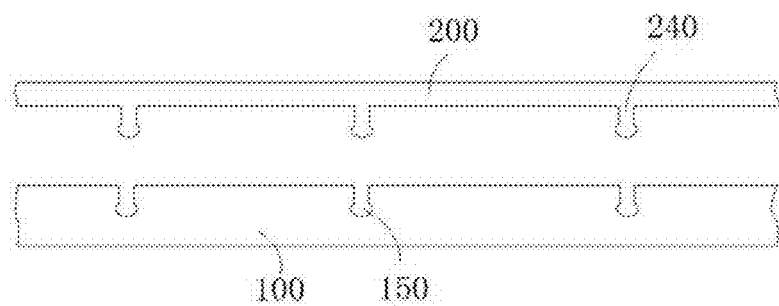
FIG. 10 is a schematic view showing another coupling manner between the front case and the rear case of the housing according to an exemplary embodiment of the present disclosure.

In addition to the chute and slider and the magnetic manner as described above, the front case 200 may be coupled to the rear case 100 in any other suitable means, such as inserting a convex part into a concave part. In an exemplary embodiment of the present disclosure, FIG. 10 is an exploded cross-sectional view of the housing taken along a direction parallel to the first rear case sidewall 120. As shown in FIG. 10, the first rear case sidewall 120 and the second rear case sidewall 130 are provided with a plurality of concave parts 150 uniformly distributed, and the first front case sidewall 220 and the second front case sidewall 230 are provided with a plurality of convex parts 240 uniformly distributed. In a case where the front case 200 and the rear case 100 are completely assembled, each of the plurality of convex parts 240 is engaged in a corresponding concave part 150. In this configuration, the front case 200 can be easily and detachably disposed on the rear case 100.

In an exemplary embodiment of the present disclosure, as shown in FIG. 10, the convex part 240 and the concave part 150 have a smooth curved shape. That is, a front end of the convex part 240 and a bottom of the concave part 150 each have a smooth curved shape so that the convex part 240 may slide into the concave part 150 smoothly by means of elastic deformation. In order to fix the front case 200 onto the rear case 100, the front end of the convex part 240 is sized to be bigger than a rear end thereof so that the convex part 240 may be engaged into the concave part 150.

As described above, an extending direction of the first rear case sidewall 120 is perpendicular to an extending direction of the second rear case sidewall 130. However, it should be understood that when the front case 200 is coupled to the rear case 100 by the magnetic manner or by inserting the convex part into the concave part, the extending direction of the first rear case sidewall 120 may not be perpendicular to the extending direction of the second rear case sidewall 130, and an angle between the two may be arbitrarily set as needed, e.g., an obtuse angle or an acute angle. For the purpose of aesthetic design, the first rear case sidewall 120 and the second rear case sidewall 130 may not be linear, but may have any suitable shape, such as a personalized character shape or the like. Similarly, an extending direction of the second front case sidewall 230 may not be perpendicular to an extending direction of the first front case sidewalls 220. The specific configuration of the two is similar to that of the first rear case sidewall 120 and the second rear case sidewall 130, and thus is not repeated here.

Figure 3B:
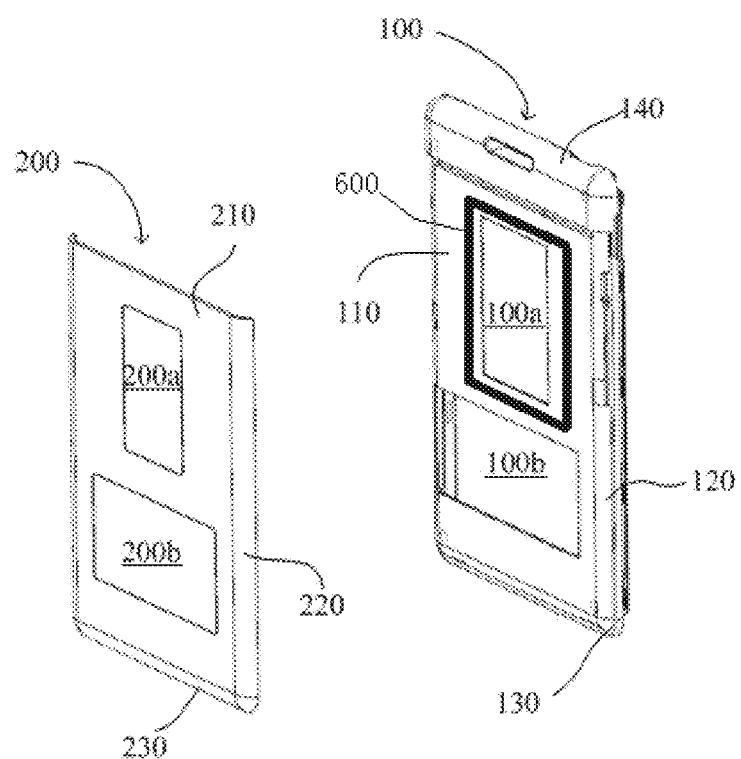

In an exemplary embodiment of the present disclosure, as shown in FIG. 3b, the housing further includes a flexible sealing member 600 disposed around at least one of the display opening 100b and the profile card receiving slot 100a. When the front case 200 and the rear case 100 are assembled, the flexible sealing member 600 is sandwiched between the front case 200 and the rear case 100 and slightly deformed so that at least one of the display opening 100b and the profile card receiving slot 100a is isolated from the outside. With this configuration, the waterproof performance of the housing and the electronic badge can be greatly improved.

Figure 11:
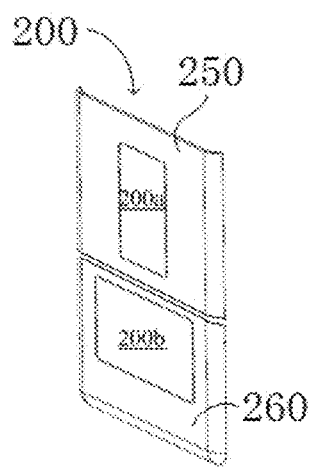
FIG. 11 is a schematic view showing a front case of the housing having a plurality of front case members according to an exemplary embodiment of the present disclosure.

As described above, the front case 200 may be a one-piece member that covers only the profile card receiving slot 100a, or covers both the display opening 100b and the profile card receiving slot 100a. However, it should be understood that the front case 200 may employ a multi-part form instead. Specifically, as shown in FIG. 11, the front case 200 may include a first front case member 250 for covering the profile card receiving slot 100a and a second front case member 260 for covering the display opening 100b. The first front case member 250 and the second front case member 260 are independently and detachably disposed on the rear case 100. With this configuration, the profile card receiving slot 100a and the display opening 100b can be individually closed or opened as needed. For example, a frequency at which the profile card receiving slot 100a is opened to replace the profile card 300 may be higher. In this case, it can be done without opening the second front case member 260 that covers the display opening 100b, thereby reducing the risk of impairing sealing or waterproof performance of the display opening. It should be understood that the above-described flexible sealing member 600 may be used in combination with the first front case member 250 and the second front case member 260, respectively.

In order to facilitate charging of the display panel, in an exemplary embodiment of the present disclosure, as shown in FIG. 6, the housing is formed with a charging hole 132 in communication with the main board cavity 10. In the embodiment shown in FIG. 6, the second front case sidewall 230 is overlapped with a portion of the second rear case sidewall 130. That is, a portion of the second rear case sidewall 130 is not overlapped with the second front case sidewall 230, on which portion the charging hole 132 is disposed. Apparently, in the present disclosure, the position of the charging hole is determined according to the specific structure of the display panel. The charging hole should directly face a charging interface of the display panel.

In an exemplary embodiment of the present disclosure, the housing is further formed with at least one button hole connected with the main board cavity 10. A button on the display panel may extend out of the housing through the button hole, thereby facilitating an operator to operate the display panel. In the embodiment shown in FIG. 1, the display panel includes a switch button A and a lock screen button B. Accordingly, button holes are provided on the housing at a position corresponding to the switch button A, and at a position corresponding to the lock screen button B, respectively. The switch button A and the lock screen button B extend out of the housing through the respective button holes.

According to another aspect of the present disclosure, there is provided an electronic badge. As shown in FIG. 6, the electronic badge includes a housing and a display panel 400, where the housing is the above-mentioned housing provided by the disclosure, the display panel is disposed in the main board cavity 10 and a display surface of the display panel is exposed from the display opening.

As described above, a user places the profile card 300 in the profile card receiving slot 100a of the housing, and encloses the profile card receiving slot 100a by the front case 200 without an adhesive for bonding, which facilitates replacement of the profile card 300. Further, the front case 200 may prevent wear of the profile card 300. Preferably, the profile card 300 may be an employee ID photo or the like.

In an exemplary embodiment of the present disclosure, the electronic badge includes a profile card 300 provided in the profile card receiving slot 100a.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A housing for an electronic badge, comprising:
a rear case defining a main board cavity, and formed with a display opening in communication with the main board cavity and a profile card receiving slot located outside the main board cavity; and
a front case detachably disposed on the rear case to enclose the profile card receiving slot or both the display opening and the profile card receiving slot, a portion of the front case opposite the profile card receiving slot or both the display opening and the profile card receiving slot being made of a transparent material, such that the profile card receiving slot or both the display opening and the profile card receiving slot are visible through the portion of the front case,
wherein the profile card receiving slot is located above the main board cavity in a top view of the rear case viewed in a direction from the front case to the rear case,
wherein the rear case comprises a rear case bottom plate, two first rear case sidewalls, and one second rear case sidewall, the first rear case sidewalls and the second rear case sidewall are both disposed on the rear case bottom plate, the two first rear case sidewalls are disposed oppositely and spaced apart, and the second rear case sidewall is connected to the two first rear case sidewalls,
the front case comprises a front case bottom plate, two first front case sidewalls and one second front case sidewall, the first front case sidewalls and the second front case sidewall are both disposed on the front case bottom plate, the two first front case sidewalls are disposed oppositely and spaced apart, and the second front case sidewall is connected to the two first front case sidewalls, and
in a case where the front case and the rear case are completely assembled, the two first front case sidewalls are respectively opposite to the two first rear case sidewalls, the second front case sidewall is opposite to the second rear case sidewall, and the front case bottom plate is opposite to the rear case bottom plate, so as to cover at least part of the rear case by the front case,
wherein the two first rear case sidewalls and the second rear case sidewall are each provided with a first magnetic member, the two first front case sidewalls and the second front case sidewall are each provided with a second magnetic member, and in a case where the front case and the rear case are completely assembled, the first magnetic member and the second magnetic member are attracted to each other, and
wherein at least one of the first magnetic member and the second magnetic member is provided with a flexible sealing film.

2. The housing according to claim 1, wherein the profile card receiving slot is a sinking slot.

3. The housing according to claim 2, wherein the profile card receiving slot is located at a side of the main board cavity in a top view of the rear case viewed in a direction from the front case to the rear case.

4. The housing according to claim 1, wherein each of the two first rear case sidewalls is formed with a chute on a surface thereof facing the first front case sidewall opposite the each of the two first rear case sidewalls, and the first front case sidewall is formed with a slider fitting the chute on a surface thereof facing the first rear case sidewall opposite the first front case sidewall.

5. The housing according to claim 4, wherein the chute is formed with an opening at an end, through which the slider enters the chute so that the front case is slidable relative to the rear case.

6. The housing according to claim 4, wherein the rear case further comprises a locking block disposed in the chute, the slider being slidable past the locking block.

7. The housing according to claim 4, wherein the rear case further comprises a hanging part disposed opposite the second rear case sidewall, where a first surface of the hanging part protrudes from the rear case bottom plate to a position flush with a surface of the front case bottom plate facing away from the rear case bottom plate in a case where the front case and the rear case are completely assembled, and the hanging part is formed with a hanging through hole.

8. The housing according to claim 4, wherein the second rear case sidewall is formed with an engaging recess on a surface thereof facing the second front case sidewall, the second front case sidewall is formed with an engaging protrusion on a surface thereof facing the second rear case sidewall, and in a case where the front case slides to a position where the second front case sidewall is attached to the second rear case sidewall, the engaging protrusion is engaged in the engaging recess.

9. The housing according to claim 1, wherein the two first rear case sidewalls and the second rear case sidewall are provided with a plurality of concave parts uniformly distributed, the two first front case sidewalls and the second front case sidewall are provided with a plurality of convex parts uniformly distributed, and in a case where the front case and the rear case are completely assembled, each of the plurality of convex parts is engaged in a corresponding concave part.

10. The housing according to claim 9, wherein the convex part and the concave part have a smooth curved shape.

11. The housing according to claim 1, further comprising a flexible sealing member disposed around at least one of the display opening and the profile card receiving slot.

12. The housing according to claim 1, wherein the front case is a one-piece member that covers the profile card receiving slot or both the display opening and the profile card receiving slot.

13. The housing according to claim 1, wherein the front case comprises a first front case member covering the profile card receiving slot and a second front case member covering the display opening.

14. The housing according to claim 13, wherein the first front case member and the second front case member are independently and detachably disposed on the rear case.

15. The housing according to claim 1, wherein the housing is formed with a charging hole and at least one button hole.

16. An electronic badge comprising a display panel and the housing according to claim 1, the display panel being disposed in the main board cavity, and a display surface of the display panel being exposed from the display opening.

* * * * *